United States Patent [19]

Agarwal et al.

[11] Patent Number: 5,795,946
[45] Date of Patent: Aug. 18, 1998

[54] HIGH BARRIER PROPYLENE COMPOSITIONS AND THEIR USE IN PACKAGING APPLICATIONS

[75] Inventors: Pawan Kumar Agarwal, Houston; Aspy Keki Mehta, Humble; Wai Yan Chow; James John McAlpin, both of Houston, all of Tex.

[73] Assignee: Exxon Chemical Patents Inc., Houston, Tex.

[21] Appl. No.: 908,831

[22] Filed: Aug. 8, 1997

Related U.S. Application Data

[63] Continuation of Ser. No. 529,863, Sep. 18, 1995, abandoned.

[51] Int. Cl.$^6$ .......................... C08F 10/06; B32B 27/32
[52] U.S. Cl. .................. 526/348.1; 526/351; 428/500; 428/523; 428/910
[58] Field of Search .................. 526/348.1, 351; 428/523, 500, 910

[56] References Cited

U.S. PATENT DOCUMENTS

| | | | |
|---|---|---|---|
| 5,169,924 | 12/1992 | Asanuma et al. | 526/160 X |
| 5,468,440 | 11/1995 | McAlpin et al. | 427/172 X |
| 5,534,595 | 7/1996 | Asanuma et al. | 526/160 X |

FOREIGN PATENT DOCUMENTS

| | | |
|---|---|---|
| 0 318 049 A1 | 5/1989 | European Pat. Off. . |
| 0 495 099 A1 | 7/1992 | European Pat. Off. . |
| 634 455 | 1/1995 | European Pat. Off. . |
| 645 426 | 3/1995 | European Pat. Off. . |
| 89 00104 | 1/1989 | WIPO . |
| 95 02630 | 1/1995 | WIPO . |
| 95 30708 | 11/1995 | WIPO . |

*Primary Examiner*—Fred M. Teskin

[57] ABSTRACT

Film is provided wherein, at least one layer comprises polymer, a molecular majority of which is derived from propylene, having water vapor transmission rate of less than or equal to about $(-7.4428 \text{ g} \times \mu m/m^2 \times day \times \%$ polymer crystallinity) (% polymer crystallinity)$+627.32 \text{ g} \times \mu m/m^2 \times day$, or $(-0.0189 \text{ g} \times mil/100 \text{ in}^2 \times day \times \%$ polymer crystallinity) (% polymer crystallity)$+1.593 \text{ g} \times mil/100 \text{ in}^2 \times day$.

7 Claims, 2 Drawing Sheets

HIGH BARRIER PROPYLENE COMPOSITIONS AND THEIR USE IN PACKAGING APPLICATIONS

This is a continuation of application Ser. No. 08/529,863, filed Sep. 18, 1995, abandoned.

FIELD OF THE INVENTION

This invention relates to low water vapor transmission rate, or high barrier, films of polypropylene. The films have notably better barrier properties than would be expected in light of their polymer crystallinity levels.

BACKGROUND OF THE INVENTION

A variety of plastic films are used in packaging applications such as bags, pouches, tubes, trays, bubble packs, composites with metal foil, composites with cellulosic material such as paper, and combinations of these. In many of these applications, it is important that the plastic film possess good physical and mechanical properties such as resistance to tearing, high tensile strength, and processability in high speed equipment.

In many applications for packaging of goods in the food and medical products industries, it may also be desired to have films with high barrier characteristics. This is particularly true for water vapor or moisture. Films having low water or moisture vapor transmission rates (WVTR or MVTR) will be particularly useful in food packaging to prevent dehydration of the packaged foodstuffs, and/or to prevent rehydration of dried foodstuffs. Similar needs arise in medical, chemical, and electronic goods packaging for which it is desired to retain high moisture levels within the package or prevent transport of water, or other moisture, across the film barrier.

It is generally believed that polypropylene homopolymer and random copolymers, having high strength and the ability to be fabricated, such as by film casting, into film, with or without post-extrusion orientation, generally have WVTR which is a directly related function of the crystallinity of the polypropylene polymer. It is thought that the higher the levels of polymer crystallinity, the lower will be the WVTR; thus imparting better barrier properties to films of more highly crystalline polypropylene. Accordingly, copolymer polypropylenes, due to their relatively low crystallinities, will show higher WVTR when compared with homopolypropylene films.

It is also well known that the melting point of polypropylene may be depressed by the inclusion of comonomer during the polymerization reaction; the comonomer within the polymer backbone appears to disrupt the crystallization of the polymer. This phenomenon appears to be independent of polymerization catalyst. This behavior is displayed when the polypropylene is catalyzed with either the traditional Ziegler-Natta catalyst or with a metallocene-type catalyst. Therefore, random copolymer polypropylenes display lower melting points and crystallinity levels. These properties are beneficial during the process of heat sealing the films.

Thus random copolymer polypropylenes, currently typically copolymers of propylene and ethylene, are useful and widely accepted in the industry for packaging films. This arises because of their good heat sealability, film mechanical properties, and film optical properties. Such copolymer films, however, do not have particularly low WVTR.

EP A 318049 describes crystalline copolymers of propylene with ethylene and/or alpha-olefins. These copolymers have melting points within the range of about 110°–140° C. and low xylene solubility.

EP A 495 099 describes propylene-alpha-olefin random copolymers having from 1–10 mole % alpha-olefin. Copolymers of Ziegler-Natta and metallocene-catalyzed polypropylene having the same or similar comonomer content were compared and evaluated for melting point decrease. FIG. 2 illustrates that melting point decreases linearly as comonomer, which is ethylene in both cases, content increases. The slope of the line shown for metallocene-catalyzed polypropylene is substantially identical to that for Ziegler-Natta catalyzed polypropylene, however, the metallocene line is shown to be about 10°–20° C. lower than the Ziegler-Natta catalyzed polypropylene line. This behavior for metallocene-catalyzed polypropylene is also documented in the technical literature including Antberg et al., *Makromolecular Chemistry*, Macromolecular Symposium, 48/49, 333, (1991).

It is well known in the polymer film art that high density polyethylene (HDPE) is useful for its moisture-barrier properties due to its high crystallinity; see, for example, W. E. Hamilton, "Food Packaging—An Opportunity for Barrier Coextrusions", 1985 Polymers, Laminations & Coatings Conference, pgs 417–440 at pg. 419. While HDPE is used in food packaging applications, its use is accompanied by some disadvantages including its brittle and cloudy, or at best translucent, nature. Polypropylene compositions known today, though having slightly lower moisture barrier performance than HDPE, have some potential benefits including clarity, and resistance to deformation and other undesirable effects at elevated temperatures. The balance of properties referred to above makes polypropylene the material of choice today in several food and medical packaging applications.

There exists a need for a greater variety of films useful for packaging, particularly flexible packaging. It would be particularly useful to have available oriented and non-oriented films with the benefits of heat-sealability, moderate stiffness, and high optical clarity, coupled with low WVTR. Our invention gives films with these qualities. We provide WVTR benefits similar to or better than those of HDPE while also providing the other useful beneficial properties of polypropylene. We also provide improved WVTR barriers over the currently used polypropylene materials.

We have also found that homopolypropylene which is polymerized by catalysts which introduce minimal defects in stereo and regio regularity also demonstrates these beneficial effects. This is particularly true with the metallocene-based catalysts with which we worked.

SUMMARY OF THE INVENTION

Random copolymer polypropylene films are provided which offer low WVTR despite having lower levels of polymer crystallity. This may be accomplished through the use of polypropylene co-polymers derived from propylene and comonomers of ethylene, higher alpha-olefins, or combinations thereof which are formed by single-site catalysis. Homopolymer polypropylene films are also provided demonstrating similar characteristics; these are produced from homopolypropylene which is generated by catalysis of propylene in the presence of catalysts which introduce minimal stereo and regio defects within the polymer molecule. Useful catalysts for producing such polymers are those which introduce less than about 2.0 mole % total defects, preferably less than about 1.5 mole %, more preferably less than about 1 mole %.

DETAILED DESCRIPTION

Our invention provides film comprising co-polymer, a molecular majority of whose backbone is derived from propylene, having water vapor transmission rate of less than or equal to about $(-7.4428 \text{ g} \times \mu\text{m/m}^2 \times \text{day} \times \% \text{ polymer crystallinity})$ $(\% \text{ polymer crystallinity}) + 627.32 \text{ g} \times \mu\text{m/m}^2 \times \text{day}$, or $(-0.0189 \text{ g} \times \text{mil/100 in}^2 \times \text{day} \times \% \text{ polymer crystallinity})$ $(\% \text{ polymer crystallinity}) + 1.593 \text{ g} \times \text{mil/100 in}^2 \times \text{day}$.

Figure 1:
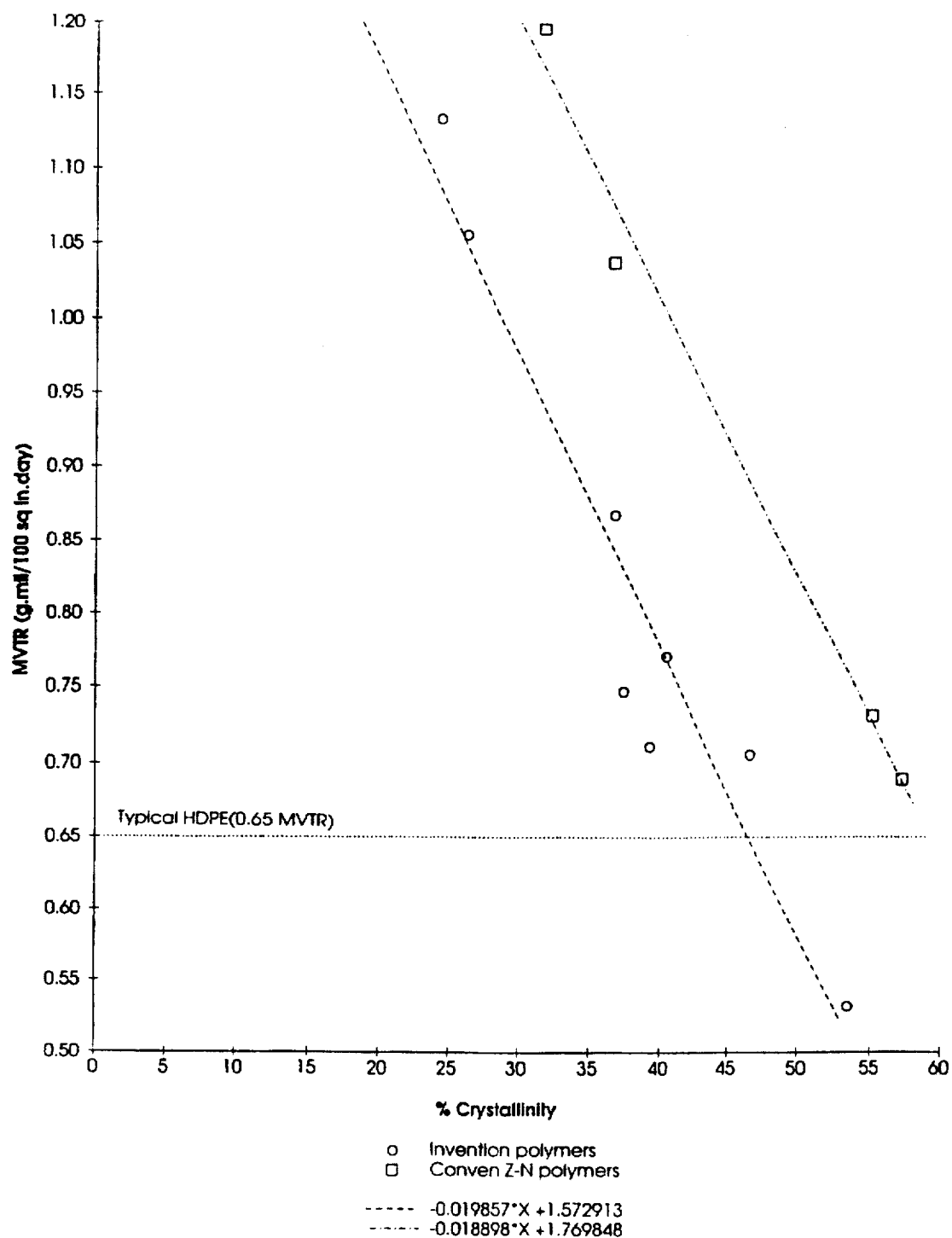
FIG. 1 provides a graphic presentation of WVTR against % crystallinity for various polypropylene films including those of this invention and those representing the previously known art.
Figure 2:
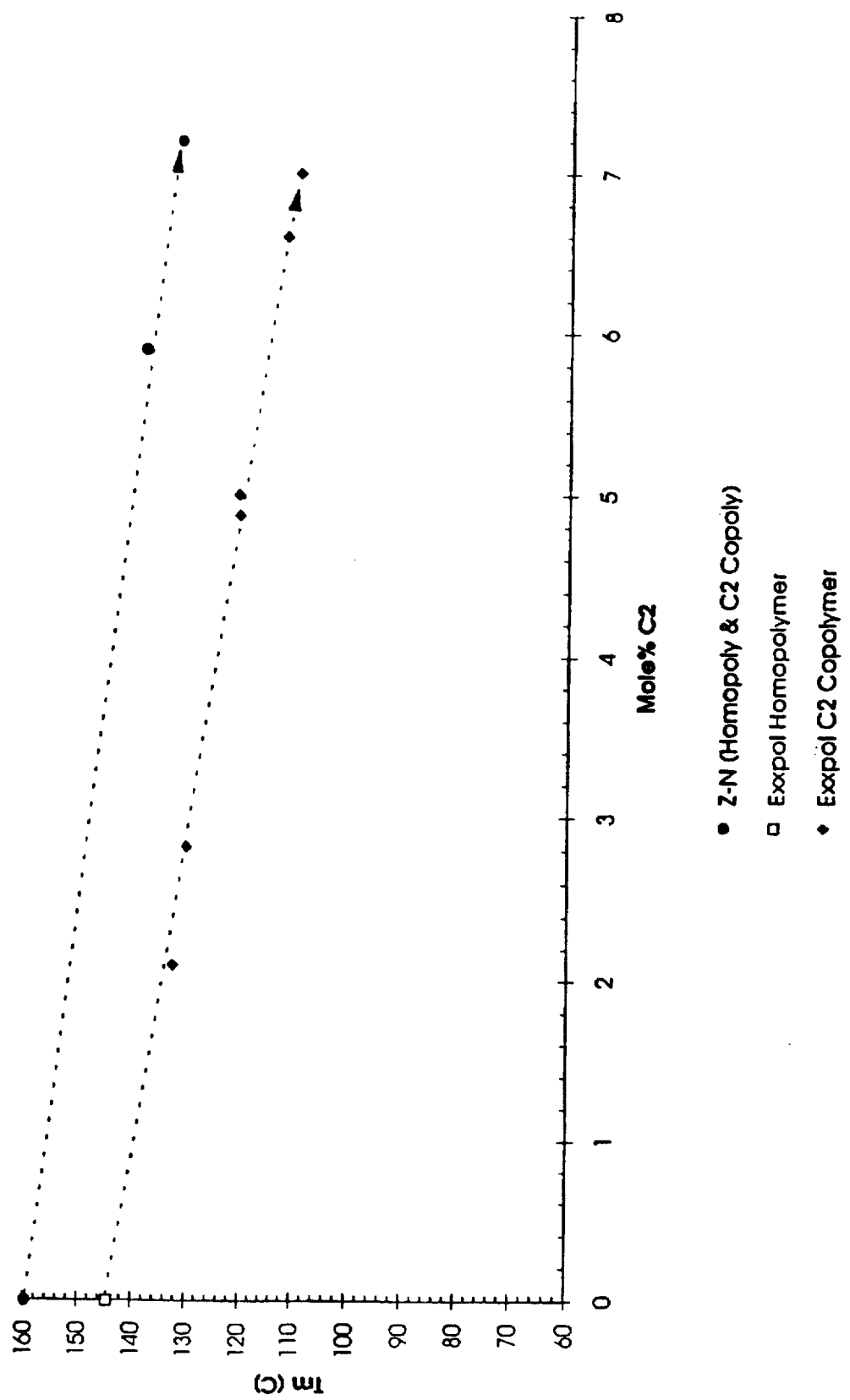
FIG. 2 provides a graphic comparison of the primary melting temperature against amount of ethylene in the polymer backbone for traditionally polymerized copolymer polypropylenes and those produced by a family of single-site catalysts.

FIG. 1 illustrates the invention.

We also provide film, especially single layer film, having water vapor transmission rate of less than or equal to about $(-7.4428 \text{ g} \times \mu\text{m/m}^2 \times \text{day} \times \% \text{ polymer crystallinity})$ $(\% \text{ polymer crystallinity}) + 627.32 \text{ g} \times \mu\text{m/m}^2 \times \text{day}$, or $(-0.0189 \text{ g} \times \text{mil/100 in}^2 \times \text{day} \times \% \text{ polymer crystallinity})$ $(\% \text{ polymer crystallinity}) + 1.593 \text{ g} \times \text{mil/100 in}^2 \times \text{day}$, within the range of about 10% through about 70% crystallinity, comprising polymer which is derived from a majority of propylene with at least one other monomer having at least one Ziegler-polymerizable bond. Preferably the polymer comprises at least about 80 weight percent propylene (based on the total weight of the polymer), more preferably at least about 85 weight percent propylene, even more preferably at least about 90 weight percent propylene.

We also provide films having similar film characteristics which are attainable by production of films from homopolypropylene derived from single-site catalysis of propylene with a catalyst which introduces minimal stereo and regio defects such as activated rac-dimethylsilylbis (2-methyl-4-phenylindenyl) zirconium dichloride. Film of homopolymer derived from this catalyst will have fewer than about 2.0 mole % total defects in the homopolymer product, preferably less than about 1.5 mole % total defects in the homopolymer product. More preferred polymers will have less than about 1 mole % total defects in the homopolymer. More defects may be tolerated to the extent that the films produced from such catalysts have these characteristics. Of course, even fewer defects are desirable and polymers produced with fewer defects, by any such catalyst known or to be developed, will produce films with similar desired characteristics. ("Defects" refers to the total mole % of misinsertions of monomer as well as misalignments in stereoregularity.)

While we have described the films of our invention as single or mono-layer films, multi-layer or coextruded films comprising a layer meeting the description of our inventive film will, of course, fall within the scope of our invention as will oriented films having these important characteristics of our inventive films. Composite films which comprise a layer meeting the description of our inventive film will also, of course, fall within the scope of our invention; this will include films of polymer/aluminum metal, polymer/paper, films which are uniaxially oriented, films which are biaxially oriented, combinations thereof or other similar films.

It may also be useful to include film property modifiers such as hydrocarbon resins, the most suitable of those being the hydrogenated aliphatic resins prepared from petroleum distillates and having softening points that are greater than about 115° C.

The area of our invention, particularly that utilizing film of copolymers or homopolymer with minimal defects, is easily visualized by reference to FIG. 1 which plots WVTR of films against % crystallinity of the propylene copolymer or homopolypropylene. The line including the points of the comparative examples, Examples 1–4, represent the capabilities of previously known art which were produced by traditional Ziegler-Natta (Z-N) catalysis. These samples are commercial products available from Exxon Chemical Company, Houston, Tex., USA. They are, respectively, PP 1042, and PP 4722 both homopolypropylene and PD 9302 and PD 9272, both of which are propylene/ethylene copolymers.

The points representing films of Examples 5 and 6–12 illustrate the inventive films which combine low crystallinity and low WVTR. Our invention falls within the area below the prior art line. WVTR for all the materials identified in FIG. 1 were measured in the same manner, according to ASTM-F-372.

Each of the aspects of our invention embrace preferred characteristics including water vapor transmission rate less than or equal to about $(-7.797 \text{ g} \times \mu\text{m/m}^2 \times \text{day} \times \% \text{ polymer crystallinity})$ $(\% \text{ polymer crystallinity}) + 622.2 \text{ g} \times \mu\text{m/m}^2 \times \text{day}$, or $(-0.0198 \text{ g} \times \text{mil/100 in}^2 \times \text{day} \times \% \text{ polymer crystallinity})$ $(\% \text{ polymer crystallinity}) + 1.58 \text{ g} \times \text{mil/100 in}^2 \times \text{day}$; packaging for perishable goods, medical devices, other goods which must retain specified levels of moisture, or combinations thereof, comprising the inventive films; packaging of dehydrated goods, or humidity-sensitive instruments, in which the acceptable level of moisture is specified at less than about 60%, 40%, 30%, 20%, or 10% to prevent rehydration for example of foodstuffs or chemicals or damage to various equipment including electronics or corrosion-prone goods, by high humidity; packaging in which perishable goods are foodstuffs, medicines, or combinations thereof; and combinations thereof.

Progressively preferred lower limits of polypropylene crystallinity will be about 10%, 20%, and 30%. At lower ranges of crystallinity several properties, including modulus or stiffness, elevated temperature resistance, and tensile strength will begin to diminish below about 30% crystallinity, will be markedly lower at about 20%, and will suffer substantially below about 10%. This means that the films, although possibly useful for barrier properties at lower polymer crystallinity levels, will need to be selected carefully for specific applications in light of diminishment of other properties at the lower crystallinity levels.

Preferred upper crystallinity limits will be about 70%, 60%, and 50%. At the higher crystallinity levels, the film may be quite brittle, and insufficiently pliable and handleable to be used in flexible packaging applications. Also, impact strength and tear strength are likely to be inferior. Furthermore, the seal initiation temperature is likely to be higher than desired. Film processability is also a challenge at greater than about 60% crystallinity. For all these reasons, the breadth of usefulness of such films could be limited even though the WVTR barrier performance may be excellent. Again, the barrier properties at these higher levels of crystallinity will be beneficial but other properties of films may limit the breadth of their usefulness.

For general broad applications the range between about 25% and about 60% crystallinity will be preferred. Films of polypropylene polymer with crystallinity in this range will find broad useful application in a variety of end uses including for packaging and medical purposes.

BACKGROUND FOR EXAMPLES

The polypropylene materials used in the practice of this invention may be produced by polymerization in the presence of single-site catalysts, particularly metallocene-based catalysts. Such catalysts may be activated with any of several alumoxane materials or with bulky, labile ionic activators. The catalyst system or its components may be supported upon an inert material or may be used without a support.

The following examples demonstrate that the propylene polymers used for the polymerization experiments which provided the polymer used in our testing were made by use of an alumoxane activated catalyst with the catalyst system usually being supported on silica. The following examples are intended to provide enhanced understanding of our invention and are not to be viewed as limiting the full scope of our invention.

In recent years several catalyst systems based upon metallocene-type chemistry have been developed. These include Welborn, EP A 129 368, or U.S. Pat. No. 5,055,438, which is hereby incorporated by reference and which describes use of cyclopentadienyl transition metal compounds for catalysis of olefins. Turner and Hlatky, EP A 277 003, EP A 277 004, and U.S. Pat. No. 5,153,157 which are incorporated by reference describe discrete catalyst systems based on metallocene-type chemistry but employing anionic activators. Canich, U.S. Pat. No. 5,057,475, incorporated by reference, describes olefin polymerization catalysis using modified metallocene-type catalysts wherein a monocyclopentadienyl/heteroatom transition metal compound is substituted for the earlier generations of metallocene compounds. Canich, Hlatky, and Turner describe, in WO 92/00333, also incorporated by reference, the use of ionic activators with monocyclopentadienyl/heteroatom transition metal compounds for olefin polymerization. Descriptions of the use of catalyst compounds with ionic activators in U.S. Pat. Nos. 5,198,401 and 5,278,119 are also incorporated by reference.

Specific metallocene-type catalysts useful for producing isotactic olefin polymers may be found in EP A 485 820, EP A 485 821, EP A 485 822, and EP A 485 823 by Winter et al, and U.S. Pat. Nos. 5,017,714 and 5,120,867 by Welborn each incorporated herein by reference. Other useful metallocene-type catalyst compounds may be found in EP A 518 092 and 519 237, as well as U.S. Pat. No. 5,145,819 each incorporated herein by reference. Some of the syntheses may be found in *Organometallics*, 13(3), pg 954–963 (1994) and EP A 320 762 (incorporated herein by reference).

Various publications describe placing catalyst systems on a supporting medium and use of the resulting supported catalysts. These include U.S. Pat. Nos. 5,006,500, 4,925, 821, 4,937,217, 4,953,397, 5,086,025, 4,912,075, and 4,937, 301, by Chang and U.S. Pat. Nos. 4,808,561, 4,897,455, 5,077,255, 5,124,418, and 4,701,432, by Welborn, all of which are incorporated herein by reference.

The following examples demonstrate the use of supported metallocene-type catalysts, for preparation of isotactic poly-alpha-olefin. Further information relating to support techniques and use of the supported catalysts may be found in U.S. Pat. No. 5,240,894 by Burkhardt (incorporated herein by reference).

While the catalysts used for the examples included here were employed in a bulk liquid-phase polymerization process, the concepts relating to catalyst use presented here may be applied to other polymerization processes including, for example, gas phase, slurry phase, and other processes.

Molecular Weight and MWD Determination

Gel Permeation Chromatography (GPC) is a liquid chromatography technique widely used to measure the molecular weight (MW) and molecular weight distributions (MWD) or polydispersity of polymers. This is a common and well-known technique. Such characteristics, as described here, have been measured using the broadly practiced techniques involving the conditions described below.

Equipment and Reagents Used:

Waters model 150C chromatograph

Three (3) Shodex AT-80M (mixed bed) columns 1, 2, 4-trichlorobenzene (HPLC grade) as solvent Sample polymer to be tested Operating Conditions:

Temperature: 145° C.

Flow rate: 1 ml/min

Run time: 50 min

Injection vol.: 300 microliters (μl)

Sample Preparation:

Samples are weighed directly in GPC vials and then trichlorobenzene (TCB) is added to a concentration of about 1 mg/ml. Dissolution is achieved in four hours in an oven maintained at about 160° C. Occasional gentle agitation is applied to the samples to facilitate the solvation process. After dissolution, the samples are inserted in the injector compartment of a Waters 150C unit. The injector and column compartments are maintained at about 145° C.

The instrument is calibrated by using narrow MWD standards and fitting the results to a third order calibration curve. The standards are polystyrene and the molecular weights shown are the equivalent weights obtained by using the appropriate Mark-Houwink constants.

Data Acquisition and Evaluation

Data are acquired and all calculations performed using Waters "Expert-Ease" software installed on a VAX 6410 computer.

Transmission Rate Determination

Moisture or water vapor transmission rates (MVTR or WVTR) were determined according to ASTM F-372 using a PERMATRAN W600 available from MOCON Modem Controls, Inc., Minneapolis, Minn., USA. This instrument measures the water vapor transmission rate through coated papers, flat films, and other flexible packaging materials. Briefly, the technique involves passing a known and constant flow of dried carrier gas through a test chamber which is isolated from a known humidity atmosphere by the film sample to be tested. Gas leaving the test chamber, carrying whatever has crossed the test sample barrier, is then analyzed using an infra-red source and detector. Multiple measurements on different specimens were averaged to obtain a value for each film sample which was tested.

Crystallinity Determination

Crystallinity levels were assessed using the enthalpy of fusion from Differential Scanning Calorimetry (DSC) measurements. The methodology is described in the book by B. Wunderlich, *Macromolecular Physics*, vol. 1, Academic Press (1973). Briefly, the weight fraction crystallinity is derived from the relationship:

$$W^c = \Delta H' / \Delta H_f$$

where $W^c$, the weight fraction crystallinity is obtained by comparing the enthalpy of fusion of the particular sample ($\Delta H'_f$) with that of completely crystalline isotactic polypropylene ($\Delta H_f$). From B. Wunderlich's *Macromolecular Physics*, vol. 3. Academic Press (1980) a literature value for $\Delta H_f$ of 164 J/g was obtained and used in our determinations. The enthalpies of fusion for all the examples cited here were from DSC measurements (Perkin-Elmer DSC 7) the instrument being operated at a heating rate of 10° C./min., following cooling/crystallization in the DSC, also at 10° C./min.

Crystallinity was also determined from density measurements (described in B. Wunderlich's *Macromolecular Physics*, vol. 1) to verify the WVTR v. Crystallinity data trends as shown in the Examples. The same trends were observed regardless of whether enthalpy or density was used to derive crystallinity.

POLYMERIZATION CATALYST PREPARATION
Supported Catalyst Preparation of rac-Dimethylsilanediylbis (2-methyl-4,5-benzo-indenyl) zirconium dichloride with alumoxane To an eight-liter vessel equipped with a cooling jacket and an efficient overhead stirrer was added methylalumoxane in toluene as obtained from Albemarle in Baton Rouge, La., USA, (30 wt %, 925 ml). With stirring, a suspension of catalyst (5.0 g of rac-dimethylsilanediylbis (2-methyl-4,5-benzo-indenyl) zirconium dichloride) in toluene (700 ml) was added under $N_2$ through a double-ended needle.

After stirring for 10 minutes, dehydrated silica (200 g Davison 948, dried at 800° C.) was added to the solution over 20 minutes. The slurry was stirred for 10 minutes and then, while vacuum was applied from the top of the vessel, a slight flow of $N_2$ was added through the bottom. The mixture was heated to 70° C. as the solvent was evaporated over a 9 hour period. The dry solid was cooled to ambient temperature overnight. Isopentane (5 liters) was added to slurry the solids and the mixture cooled to 0° C. Ethylene was added to the stirred mixture by a dip tube at a rate of 0.85-1.7 l/minute (0.03-0.06 SCF/minute) until a total of 491 liters of ethylene had been added. Agitation was stopped and the solids allowed to settle. The liquid was decanted from the solids, which were washed twice, each with 1.5 liters of isopentane. The wet solids were transferred to a dry-box under $N_2$ and filtered through a #14 mesh sieve. The fine particles were filtered off, washed with pentane (4 liters) and dried in vacuo. Yield: 326 g.

A useful synthesis of the rac-dimethylsilanediylbis (2-methyl-4,5-benzo-indenyl) zirconium dichloride may be found in EP A 549 900 and CA 2,084,017, which are incorporated by reference. This catalyst was used to make the polymer used for Examples 6-12. The catalyst used for Example 5 is described in EP A 576 970 and CA 2,099,214 which are also incorporated by reference. Other particularly useful catalysts and their syntheses are described in EP A 600 461 and U.S. Pat. No. 5,296,434, as well as U.S. Pat. No. 5,328,969, and EP A 576 970 and CN 2,099,214.

POLYMERIZATION EXAMPLES

A summary of the polymerized product examples are shown in Table 1. Examples 1-4 are commercially available polypropylene polymers which are polymerized with traditional Ziegler-Natta catalysts. Examples 6-9 and 11-12 are polymers of this invention polymerized in a laboratory-scale liquid phase reaction process utilizing the supported metallocene catalyst whose preparation was described earlier. The polymer of Example 10 was produced with the same catalyst but the polymerization was conducted in a liquid-phase pilot-scale reactor. Finally, the polymer of Example 5 was polymerized by unsupported MAO activated catalyst based on rac dimethylsilylbis(2-methyl-4-phenylindenyl) zirconium dichloride as described in EP A 576 970 and CA 2,099,214, in a liquid-phase pilot-scale reactor.

(EXAMPLES 6-9 and 11-12)
Laboratory Scale Polymerizations

Triethyl alumoxane (TEAL) is injected as a scavenger with a total of 1000 ml of dry propylene, with the desired amount of comonomer, into a jacketed stainless steel reactor. Agitation of the reactor is started and the reactor is brought up to the desired temperature by passing steam through the jacket. The catalyst system, is charged into the jacketed reactor with a 250 ml propylene flush. The reaction is then allowed to run for about an hour.

The polymerization reaction is stopped by cooling the reactor to a temperature of less than about 40° C. and the agitator is stopped. The reactor is depressurized and purged with nitrogen for about 20 minutes. At this point the reactor is opened and the polymer of interest is removed. Polymerization details for the different laboratory-scale produced examples are included in Table 1.

(EXAMPLE 10)
Pilot-Scale Polymerization

The polymerization of this propylene/hexene-1 copolymer was conducted in a single, continuous, stirred tank reactor, bulk liquid-phase polymerization process. The reactor was equipped with a jacket for removing the heat generated by the polymerization reaction. The reactor temperature was set at 55° C. Catalyst, as described earlier, was fed at a rate of 18.2 g/hour. The catalyst was fed as a 15% slurry in mineral oil and was flushed into the reactor with propylene. Propylene monomer was fed at a rate of 63.5 kg/hour. Hexene-1 was delivered at a feed ratio, to the propylene, of 0.05. No hydrogen was added during the polymerization. Copolymer was produced at a rate of 9.1 kg/hour. The polymer was discharged from the reactor as granular product having MFR of 4.3 and hexene incorporation of 2.8 wt %.

(EXAMPLE 5)
Pilot Scale Polymerization

The polymerization was conducted in a stirred tank batch reactor. Liquid propylene was introduced to the reactor at a temperature of about 30° C. The catalyst system comprised rac dimethylsilylbis(2-methyl-4-phenylindenyl) zirconium dichloride metallocene and MAO (10% in toluene), for activation. 0.1 g of metallocene was used with the ratio of MAO to metallocene in the catalyst being 500:1 on a mole basis. The catalyst solution was charged to the reactor and the reactor temperature taken to about 65° C. After about three hours residence time, the reaction was stopped, the residual monomer flashed off, and the polymer recovered as a fine granular product. Polymer productivity was about 500 kg of polymer per gram of metallocene per hour. The homopolymer MFR was measured at 5.5.

Polymer Characteristics

Weight per cent of comonomer in the polymer was determined by $^{13}C$-NMR.

A description of the general NMR technique may be found in *The Encyclopedia of Polymer Science and Engineering*. $2^{nd}$ ed., vol.10, pg. 254, Wiley-Interscience Publication (1987). A description of the methodology for propylene-ethylene polymers may be found in Carman, C. J., Harrington, R. A., and Wilkes, C. E., *Macromolecules*, 10 (3), pg. 536, 1977.

TABLE 1

Polymerization Process and Characteristics of Propylene-Based Polymers Tested as Examples

| Example | Catalyst Type (amt) | TEAL(ml) | Comonomer (ml) | Reactor Temp °C. | Comonomer wt % | $M_w$ | $M_w/M_n$ | Yield,g |
|---|---|---|---|---|---|---|---|---|
| 1 | Ziegler-Natta | | n/a | | 0 | 391 K | 5.26 | |
| 2 | Z—N | | n/a | | 0 | 388 K | 3.56 | |
| 3 | Z—N | | $C_2^=$ | | 4 | 290 K | 3.74 | |
| 4 | Z—N | | $C_2^=$ | | 5 | 283 K | 3.12 | |
| 5 | Metallocene | | n/a | | 0 | 235 K | 1.9 | |
| 6 | MCN (0.23 g) | 0.5 | n/a | 65 | 0 | 231 K | 1.87 | 218 |
| 7 | MCN (1.68 g) | 1.0 | $C_8^=(25)$ | 60 | 1.6 | 201 K | 1.7 | 89 |
| 8 | MCN (18 g) | 1.0 | $C_4^=(75)$ | 60 | 4.2 | 227 K | 1.71 | 117 |
| 9 | MCN (0.203 g) | 0.5 | $C_2^=(50)$ | 55 | 1.9 | 215 K | 1.77 | 82 |
| 10 | MCN | | $C_6^=$ | | 2.8 | 248 K | 1.77 | |
| 11 | MCN (0.209) | 0.5 | $C_2^=(150)$ | 40 | 4.5 | 188 K | 1.71 | 143 |
| 12 | MCN (0.216) | 0.5 | $C_2^=(150)$ | 40 | 4.8 | 185 K | 1.86 | 148 |

Preparing Film Samples

Compression molded films were made from the polymerized Examples and were prepared as monolayer structures. The pellets or granules of the polymers of the examples were compression molded using a laboratory-sized compression molding unit, Wabash Press, Model 30-1515-2T2WCMB, available from Wabash Metal Products, Inc., Wabash Ind., USA. The molding occurred with a maximum pressure of about 27,270 kg (30 tons) on an about 12.7 cm (5 in.) diameter ram. The samples were subjected to a pressure of about 18,180 kg (20 T) at about 220° C. Following the heating cycle of five minutes at about 220° C. under this pressure, the molded films were removed and immediately quenched in ambient temperature water. The films were conditioned under ambient conditions for about 48 hours. The films were all about 0.13 mm (0.005 in) thick.

Melting and crystallinity characteristics for the polymers and barrier properties (WVTR) of the films produced from them are described in Table 2. The melting characteristics were determined using a differential scanning calorimeter (DSC), at a heating rate of about 10° C./min. The main peak melting temperature data (second melt in DSC) were noted and are reported in Table 2. This table also includes similar information relating to films of the prior art which were prepared and tested the same way, and a representative value for HDPE film.

TABLE 2

Melting, Crystallinity, and WVTR Characteristics of Propylene-Based Polymers Tested as Examples

| Example | Catalyst Type | Comonomer | Comonomer wt % | Primary $Tm_{(°C.)}$ | % Xtal | WVTR |
|---|---|---|---|---|---|---|
| 1 | Ziegler-Natta | 0 | 0 | 160.5 | 57.3 | 0.6897 |
| 2 | ZN | 0 | 0 | 161 | 55.2 | 0.7314 |
| 3 | ZN | $C_2^=$ | 4 | 138.5 | 36.8 | 1.048 |
| 4 | zN | $C_2^=$ | 5 | 132 | 31.9 | 1.196 |
| 5 | Metallocene | 0 | 0 | 159 | 53.4 | 0.5325 |
| 6 | MCN | 0 | 0 | 144.5 | 46.6 | 0.7065 |
| 7 | MCN | $C_8^=$ | 1.6 | 132.5 | 40.5 | 0.79 |
| 8 | MCN | $C_4^=$ | 4.2 | 132.5 | 39.3 | 0.73 |
| 9 | MCN | $C_2^=$ | 1.9 | 130 | 37.4 | 0.77 |
| 10 | MCN | $C_6^=$ | 2.8 | 128 | 36.8 | 0.868 |
| 11 | MCN | $C_2^=$ | 4.5 | 111.5 | 26.4 | 1.0566 |
| 12 | MCN | $C_2^=$ | 4.8 | 109.1 | 24.5 | 1.134 |
| HDPE (reference) | | | | | | 0.65 |

Notes:
% Crystallinity from enthalpy of fusion measurements
WVTR units are g × mil/100 in² × day
Representative value of 0.65 WVTR for HDPE from J. R. Newton, "High Barrier Materials", Future Trends in Vacuum Web Coating Seminar, Assoc. of Industrial Metallizers, Coaters, and Laminators, October 1983.
Examples 1–4 represent prior art; 5–12 exemplify this invention.

While our testing was performed with compression molded films, the data, formation derived from them, and trends identified are applicable to other films such extruded and cast films, including those which are post-extrusion oriented. While coextruded or other multilayer films will gain benefits from inclusion of the technology described by our invention, the inventive films will find particularly beneficial use in monolayer film construction applications. Further, films of our invention may usefully include various additives which may be added in the molten state prior to pelletization, added after pellet or granule formation, added in the extruder melt, or combinations thereof.

Any of the polyolefin additives typically used with traditionally catalyzed polymers will serve beneficial purposes. Such additives will include stabilizers and neutralizers, slip agents including erucamide, antiblock agents including silica, and nucleating agents.

It is common practice in polypropylene compounding to incorporate various types of nucleating agents to enhance the rate of crystallization. An enhancement of barrier properties is expected through the use of such commercially available nucleating agents including talc and sorbitol.

We claim:

1. Composite film having one or more layers comprising polypropylene co-polymer, a majority of whose backbone is derived from propylene, wherein said film has a water vapor transmission rate of less than or equal to about $(-7.4428\ \text{g}\times\mu\text{m}/\text{m}^2\times\text{day}\times\%\ \text{polymer crystallinity})\ (\%\ \text{polymer crystallinity})+627.32\ \text{g}\times\mu\text{m}/\text{m}^2\times\text{day}$, or $(-0.0189\ \text{g}\times\text{mil}/100\ \text{in}^2\times\text{day}\times\%\ \text{polymer crystallinity})\ (\%\ \text{polymer crystallinity})+1.593\ \text{g}\times\text{mil}/100\ \text{in}^2\times\text{day}$.

2. Oriented film having one or more layers comprising polypropylene co-polymer, a majority of whose backbone is derived from propylene, wherein said film has a water vapor transmission rate of less than or equal to about $(-7.4428\ \text{g}\times\mu\text{m}/\text{m}^2\times\text{day}\times\%\ \text{polymer crystallinity})\ (\%\ \text{polymer crystallinity})+627.32\ \text{g}\times\mu\text{m}/\text{m}^2\times\text{day}$, or $(-0.0189\ \text{g}\times\text{mil}/100\ \text{in}^2\times\text{day}\times\%\ \text{polymer crystallinity})\ (\%\ \text{polymer crystallinity})+1.593\ \text{g}\times\text{mil}/100\ \text{in}^2\times\text{day}$.

3. A film having one or more layers comprising isotactic propylene homopolymer having a primary melting temperature in the range of from 140° C. to 160° C., said film having a water vapor transmission rate of less than or equal to $(-7.4428\ \text{g}\times\mu\text{m}/\text{m}^2\times\text{day}\times\%\ \text{polymer crystallinity})\ (\%\ \text{polymer crystallinity})+627.32\ \text{g}\times\mu\text{m}/\text{m}^2\times\text{day}$, or $(-0.0189\ \text{g}\times\text{mil}/100\ \text{in}^2\times\text{day}\times\%\ \text{polymer crystallinity})\ (\%\ \text{polymer crystallinity})+1.593\ \text{g}\times\text{mil}/100\ \text{in}^2\times\text{day}$.

4. The film of claim 3 wherein the water vapor transmission rate is less than or equal to $(-7.797\ \text{g}\times\mu\text{m}/\text{m}^2\times\text{day}\times\%\ \text{polymer crystallinity})\ (\%\ \text{polymer crystallinity})+622.2\ \text{g}\times\mu\text{m}/\text{m}^2\times\text{day}$, or $(-0.0198\ \text{g}\times\text{mil}/100\ \text{in}^2\times\text{day}\times\%\ \text{polymer crystallinity})\ (\%\ \text{polymer crystallinity})+1.593\ \text{g}\times\text{mil}/100\ \text{in}^2\times\text{day}$.

5. The film of claim 4 wherein the polymer crystallinity is in the range of about 10% through about 70%.

6. The film of claim 4 wherein the polymer crystallity is in the range of about 20% through about 60%.

7. The film of claim 4 wherein the polymer crystallity is in the range of about 30% through about 50%.

* * * * *